(12) United States Patent
Haladuda et al.

(10) Patent No.: US 7,137,666 B2
(45) Date of Patent: Nov. 21, 2006

(54) VEHICLE SEAT WITH A PIVOTABLE BACKREST

(75) Inventors: Guido Haladuda, Leichlingen (DE); Michael Hoerl, Wermelskirchen (DE); Michael Comes, Leverkusen (DE); Patrick Stachel, Remscheid (DE); Walter Link, Leverkusen (DE)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 10/492,109

(22) PCT Filed: Sep. 30, 2002

(86) PCT No.: PCT/EP02/10953

§ 371 (c)(1),
(2), (4) Date: Apr. 8, 2004

(87) PCT Pub. No.: WO03/033296

PCT Pub. Date: Apr. 24, 2003

(65) Prior Publication Data

US 2004/0245829 A1    Dec. 9, 2004

(30) Foreign Application Priority Data

Oct. 10, 2001   (DE) ................. 101 49 858

(51) Int. Cl.
*B60N 2/02* (2006.01)
(52) U.S. Cl. .................. 297/378.12; 297/367
(58) Field of Classification Search .......... 297/15, 297/378.12, 367; 296/65.01, 65.09
See application file for complete search history.

(56) References Cited

U.S. PATENT DOCUMENTS

| | | | |
|---|---|---|---|
| 5,205,609 A * | 4/1993 | Notta et al. ................. 297/367 |
| 5,383,699 A | 1/1995 | Woziekonski et al. |
| 5,482,349 A * | 1/1996 | Richter et al. ................. 297/15 |
| 5,527,087 A * | 6/1996 | Takeda et al. ................. 297/15 |
| 5,542,745 A * | 8/1996 | Takeda et al. ......... 297/378.12 |
| 5,570,931 A * | 11/1996 | Kargilis et al. ........ 297/378.12 |
| 5,588,705 A * | 12/1996 | Chang ........................ 297/367 |
| 6,113,191 A * | 9/2000 | Seibold ................... 297/378.1 |
| 6,435,589 B1 * | 8/2002 | Shimizu et al. .......... 296/65.09 |
| 6,447,066 B1 * | 9/2002 | Chabanne et al. .......... 297/367 |
| 6,513,875 B1 * | 2/2003 | Gray et al. ............ 297/378.14 |

FOREIGN PATENT DOCUMENTS

| | | |
|---|---|---|
| DE | 196 16 070 A1 | 11/1997 |
| DE | 199 64 143 A1 | 3/2001 |
| DE | 100 47 742 A1 | 4/2002 |
| GB | 2 355 180 A | 4/2001 |
| JP | 06219196 A | 8/1994 |
| JP | 08011677 A | 1/1996 |
| JP | 2000071833 A | 3/2000 |

* cited by examiner

Primary Examiner—Peter M. Cuomo
Assistant Examiner—Sarah B. McPartlin
(74) Attorney, Agent, or Firm—Foley & Lardner LLP

(57) ABSTRACT

A seat for use in a vehicle that is configured to be movable between a generally upright in-use position and a retracted cargo position includes a seat base, a seat part having a rear region and a front region, a first articulated arm having a first end coupled to the rear region of the seat part and an opposite second end coupled the seat base, the first articulated arm having a horizontal axes of rotation, and a backrest rotatably coupled to the first end of the first articulated arm and movable between the in-use position and the cargo position. The backrest is lowerable together with the seat part toward the seat base into the cargo position providing an increased freight space above the backrest.

26 Claims, 4 Drawing Sheets

VEHICLE SEAT WITH A PIVOTABLE BACKREST

FIELD

The invention relates to a seat, in particular a rear seat of a motor vehicle, comprising a seat base, a seat part and a backrest and also a first articulated arm having horizontal axes of rotation, said articulated arm being coupled in the rear region of the seat part at one end and to the seat base at the other end, with the backrest being pivotable from an essentially upright in-use position horizontally onto the seat part and being lowerable together with the latter toward the seat base into a cargo position.

BACKGROUND

A seat of the generic type is described in German utility model application 201 14 059.4 which is still unpublished. The seat comprises a seat base which is secured on the vehicle body and also a seat part and a backrest which forms the seat surface in the in-use position. In order to enlarge the loading area or to produce a table surface, the backrest can be pivoted toward the seat part from the upright position into a horizontal cargo position.

In order to avoid a collision between the upholstery of the seat part and backrest before the latter has taken up the horizontal position, the seat part is designed in a manner such that it can be lowered relative to the backrest and seat base. For this purpose, it is connected to the seat base at the front and rear via two articulated arms which are aligned essentially parallel to each other. During the pivoting of the backrest, which, for its part, is connected to the seat base via a separate joint, the lowering of the seat part is brought about by means of a lever mechanism acting between the backrest and seat part. When the backrest is raised, the same device brings about the raising of the seat part.

The seat described in this document entirely satisfies the demands placed on it.

SUMMARY

The invention is based on the object of enlarging the loading space of a vehicle with little complexity in terms of design, with the backrest being folded over.

According to one embodiment of the present invention, the object is achieved by the backrest being coupled rotatably to that joint of the first articulated arm which is on the seat part. This design enables the seat part and the backrest, as it is being pivoted, to be lowered together, so that the floor of the loading space is designed to be lower overall.

According to the embodiment, a second articulated arm is preferably arranged in the front region of the seat part, the second articulated arm being coupled to the seat part at one end and to the seat base at the other end and being aligned essentially parallel to the first articulated arm. The seat part thereby approximately forms a parallelogram with the front and rear articulated arms and with the seat base and, as it is lowered, is shifted largely horizontally forward and downward. The kinematics can be changed in a specific manner by small deviations from the ideal form of the parallelogram, with the result that the seat part is raised at the front with respect to the horizontal in the manner of a ramp in the in-use position, but is aligned horizontally in the cargo position.

According to another embodiment of the present invention, the seat part has a rigid, upwardly protruding link plate, the protruding end of which is coupled to the first articulated arm. By means of this measure, the pivot point of the backrest is shifted upward with respect to the seat part and the space required for the relevant cushion elements when folding over the backrest is provided.

In order to define the end position of the seat in the in-use position, the link plate and the first articulated arm are supported on each other in the in-use position via a supporting cam which is preferably arranged on the first articulated arm. An over-rotation of the backrest is prevented by the backrest and link plate or articulated arm being supported on each other in the in-use position via a supporting cam which is integrally formed on the link plate or articulated arm.

According to one particular design of the invention, the link plate and the first articulated arm are provided locally on their circumference in the region of the common joint with a toothing into which the toothing of a pawl can be brought into engagement. The local toothing of the link plate and first articulated arm are preferably aligned congruently in the in-use or cargo position and can be brought into engagement with the congruently designed toothing of the pawl. The upper joint of the rear articulated arm is thereby locked in every direction of rotation, which means that a single blocking device can be used both to block a pivoting of the backrest and the lowering of the seat surface.

The pawl is advantageously arranged rotatably on the backrest and can be blocked in the latching positions by means of a cam, so that the toothing does not have to be designed to be self-locking. The latching of the cam furthermore indicates that the pawl has engaged in the congruently aligned toothings of the link plate and articulated arm, and the seat is now locked in the in-use or cargo position.

In order to prevent an occupant from sitting on a seat which has not yet been locked in the in-use position, provision may also be made for the backrest to only be able to be brought into the in-use position when the seat part has for its part taken up the in-use position. In order nevertheless to be able to use the backrest in an ergonomically favorable position as a lever for raising the seat part, it can preferably only be pivoted back into a forwardly inclined position before the seat part has taken up the in-use position. There is no risk, in this position, of the backrest of the seat part being loaded by the body weight of an occupant. Kinematics of this type can be realized with little complexity in terms of design by a projection which is operatively connected to the pawl being integrally formed on the circumference of the articulated arm and it being possible to bring the pawl into abutment against said projection when raising the backrest until the articulated arm has for its part taken up the in-use position.

In order to facilitate the raising of the seat part when pivoting the backrest into the in-use position, according to a further variant of the invention, a first spring element can be tensioned when the seat part is lowered. After the lock has been released, the energy stored in said spring element assists the change in position of the seat from the cargo position. In order to avoid knocking the seat in the in-use position, a second spring element can furthermore be provided, which can be tensioned when the seat part is raised and counteracts the force of the first spring element in particular shortly before the in-use position is reached.

FIGURES

The FIGURES illustrate a preferred embodiment of a vehicle seat with a pivotable backrest by way of example and schematically.

DETAILED DESCRIPTION

Figure 1:
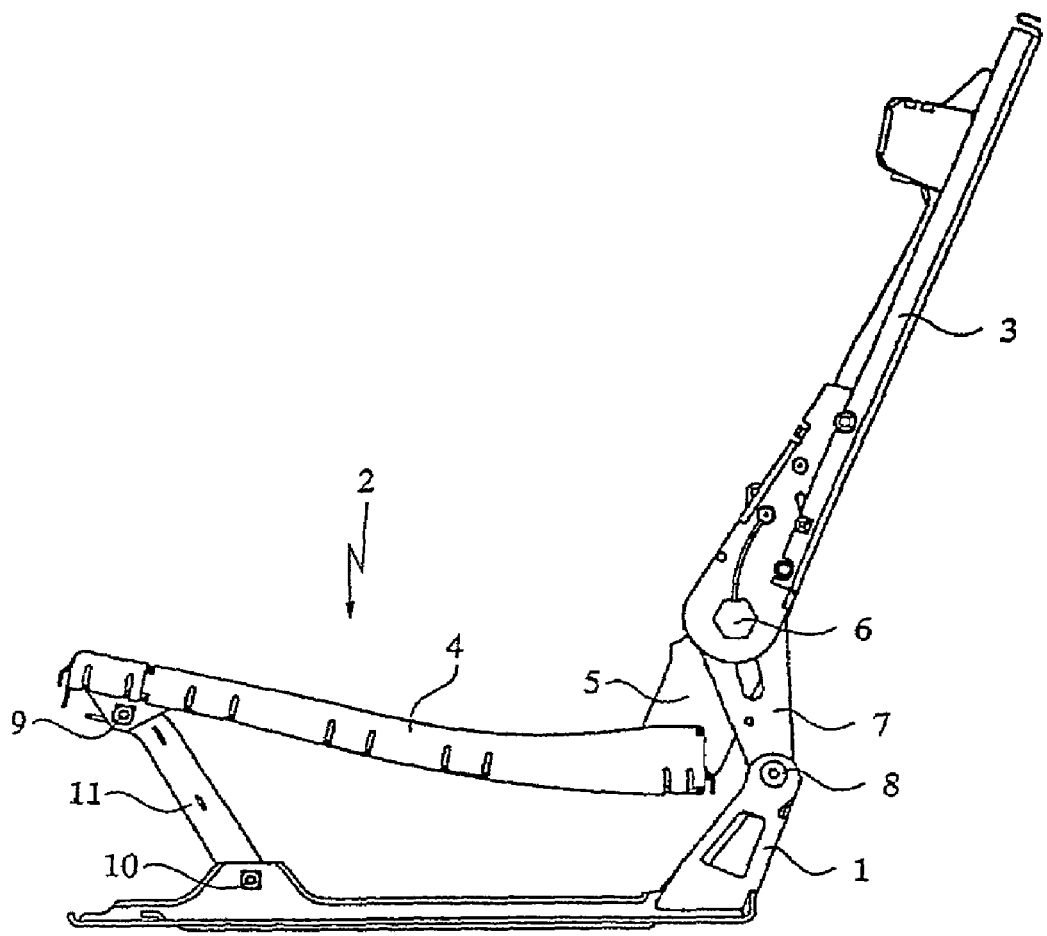
FIG. 1 shows a side view of a seat in an in use position.

The vehicle seat illustrated in FIG. 1 comprises a seat base 1 which is mounted (e.g., screwed, etc.) in a positionally fixed manner to the floor of the vehicle body, and also a seat part 2 and a backrest 3 which are provided in use with cushion elements (not illustrated). As can be appreciated, the vehicle seat may also include any of a variety of conventionally known mechanisms providing for the longitudinal adjustment of the seat.

The seat part 2 comprises a seat trough 4 having a rear end that is rigidly to two link plates 5. The link plates 5 are arranged next to each other and protrude upward. The protruding ends of the link plates 5 are designed as a first joint 6 which can be rotated about a horizontal axis and to which upper ends of articulated arms 7 are coupled. Lower ends of the articulated arms 7 are connected to the seat base 1 via a second joint 8 that is horizontally rotatable.

Figure 2:
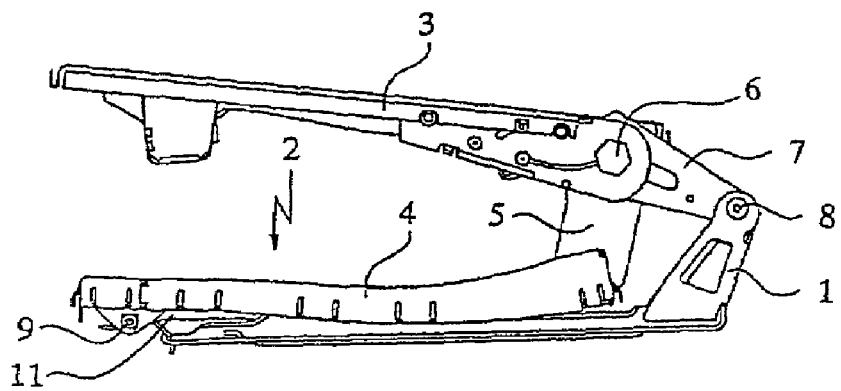
FIG. 2 shows the seat according to FIG. 1 in a cargo position.

A similar arrangement with articulated arms 11 arranged between third joints 9 and fourth joints 10 is found in the front region of the seat part 2 and the seat base 1. The articulated arms 7, 11 approximately form a parallelogram with seat part 2 and seat base 1, in which case seat part 2 which is guided by the articulated arms 7, 11 is shifted forward as it is being lowered into the cargo position (shown in FIG. 2). According to a particularly preferred embodiment, seat part 2 is shifted simultaneously forward as the vehicle seat is being lowered into the cargo position.

The backrest 3 arranged rotatably in the first joint 6 by means of a lower end, so that backrest 3 can firstly be pivoted about a horizontal axis onto the seat part 2 and, secondly, can be lowered together not the latter with the seat part 2 into the cargo position. In the cargo position, an enlarged freight space is therefore available above the backrest.

Figure 3:
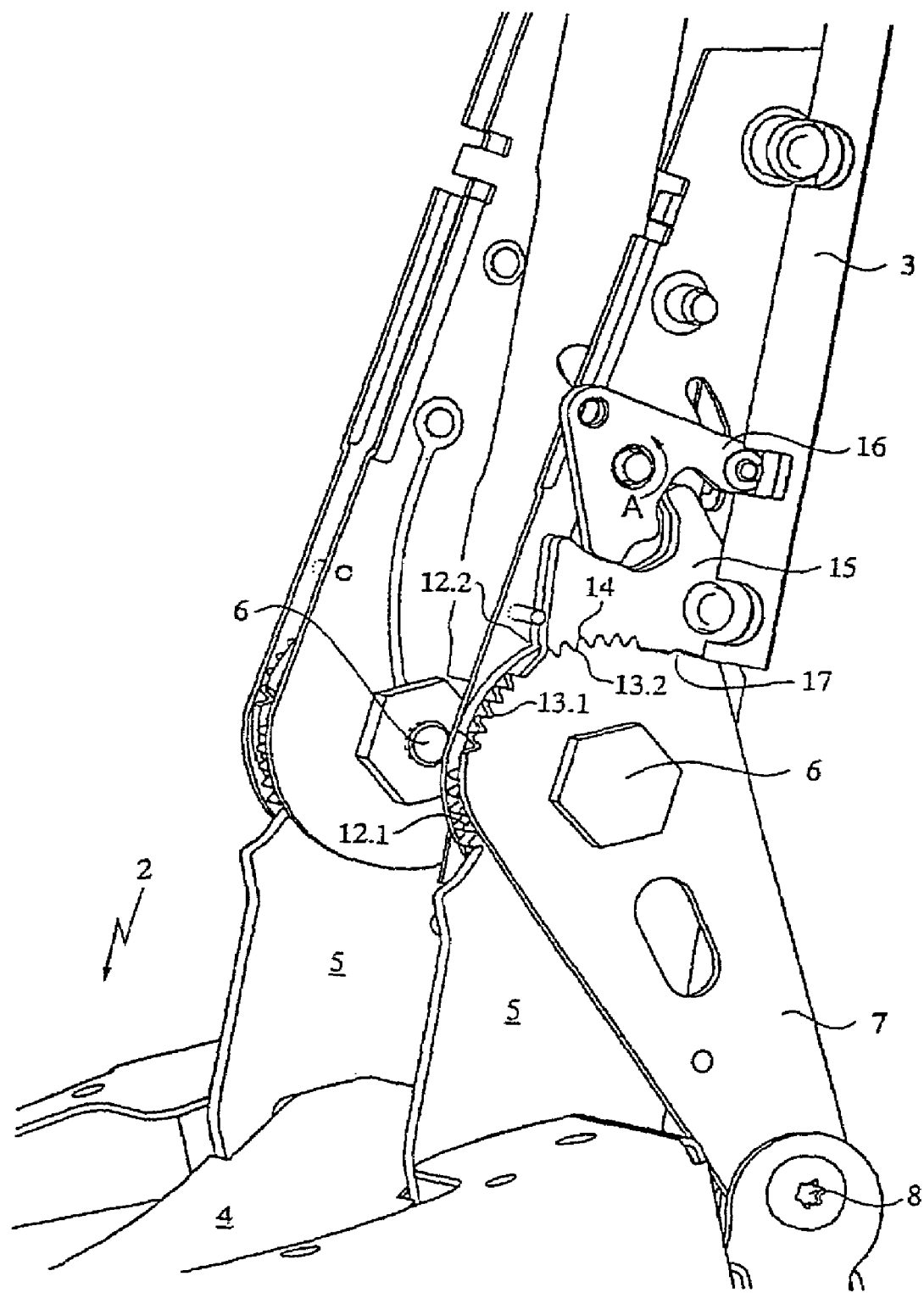
FIG. 3 shows a common joint of a backrest, link plate and articulated arm in a perspective view in the in-use position.
Figure 4:
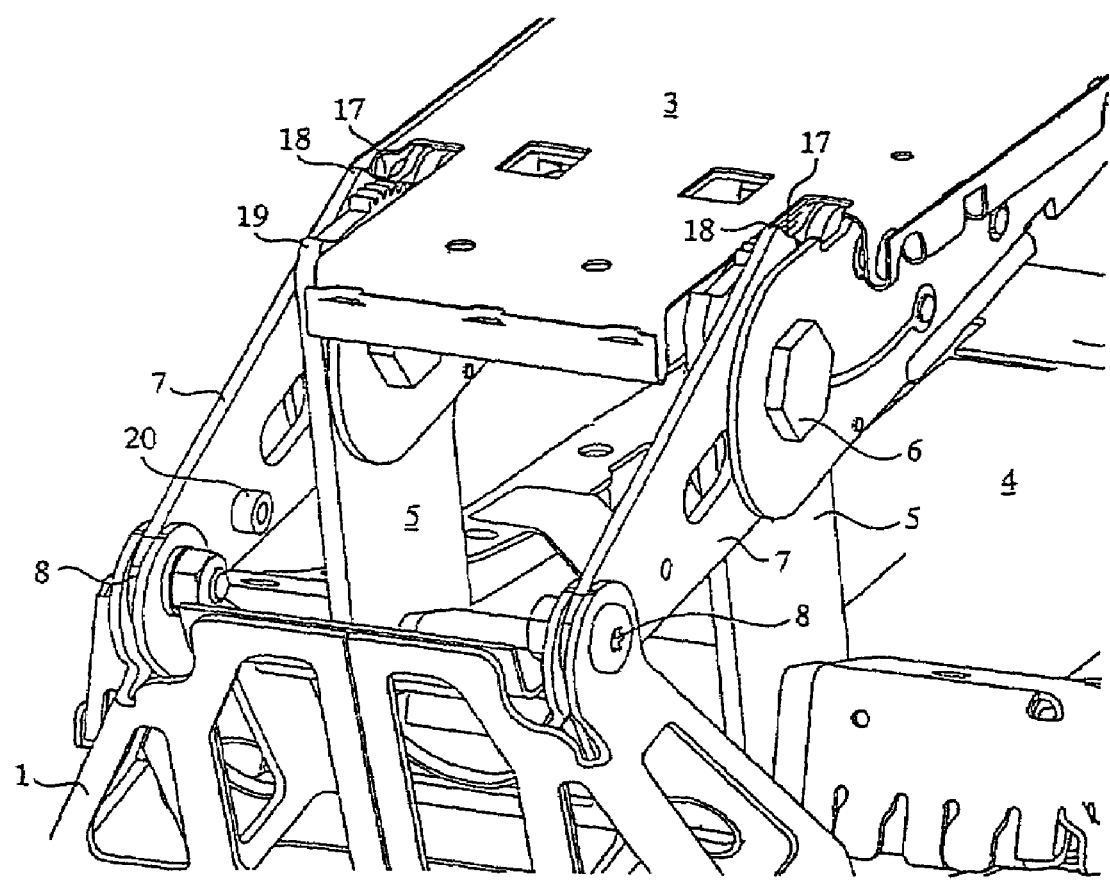
FIG. 4 shows a perspective view of the common joint according to FIG. 3 in the cargo position.

Referring to FIG. 3, the link plates 5 further include "toothings" 12.1 and 12.2 located circumferentially in the region of first joint 6. Accordingly, articulated arms 7 include "toothings" 13.1 and 13.2 that are located adjacent to "toothings" 12.1 and 12.2 located on link plates 5. In the in-use position illustrated, the toothings 12.1 and 13.1 are aligned congruently with each other, so that a pawl 15 which is equipped with a congruent toothing 14 and is arranged rotatably on the backrest 3 can latch into the toothings 12.2 and 13.2. This enables the link plate 5, the articulated arm 7 and the backrest 3 to be secured in a rotationally fixed manner with respect to one another and the seat in its entirety to be locked in the in-use position. A cam 16 secures the pawl 15 after it has latched into its position. By means of rotation in the direction of the arrow "A", which may be brought about by an actuating device (not illustrated), the cam is furthermore suitable for lifting the pawl off the toothings 12.2 and 13.2, with the result that the backrest 3 and seat part 2 can be moved into the cargo position (shown in FIG. 4). In this position, the toothings 12.1 and 13.1 come into an overlapping state into which the pawl 15 subsequently latches. The vehicle seat is now relatively secured in the cargo position. The release of the pawl 15 for transferring the seat into the in-use position again takes place analogously.

In this case, the backrest 3 can, however, only be raised until the raised pawl 15 bears with its circumference against a projection 17 which, for its part, is integrally formed on the circumference of the articulated arm 7. Only when the articulated arm 7 has taken up the in-use position, and has therefore rotated relative to the backrest 3 can the pawl 15 rotate past the projection 17. The backrest can now be pivoted into the in-use position which is illustrated in FIG. 3 and in which the pawl 15 again latches into the toothings 12.2 and 13.2. In this case, the backrest 3 is supported via the pawl 15 on supporting cams 18, 19 which may be integrally formed on the link plate 5 and the articulated arm 7. An end stop for the rotational movement between the link plates 5 and articulated arms 7 may be formed by supporting cams 20 arranged on them.

Figure 5:
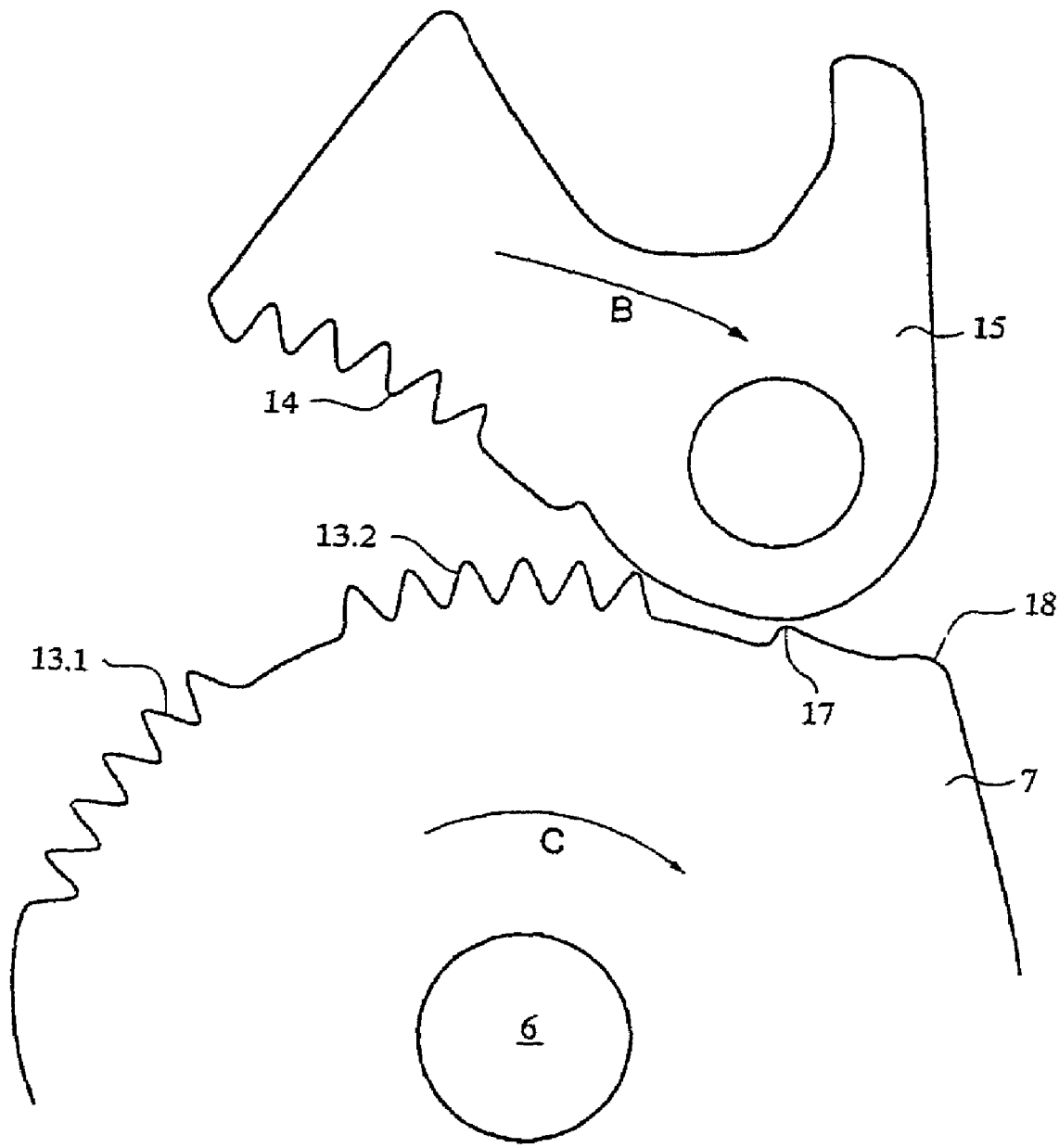
FIG. 5 shows an enlarged illustration of a pawl and articulated arm according to a particularly preferred embodiment.

FIG. 5 shows, in an enlarged illustration, the bearing of the pawl 15 against the projection 17 which is integrally formed on the circumference of the articulated arm 7. Projection 17 is intended to prevent the pawl 15, which bears on projection 17 in an intermediate position, from pivoting further and therefore is also intended to prevent the backrest 3 from pivoting about first joint 6 (arrow "B") until the articulated arm 7 has been rotated in the direction of the arrow "C" into the in-use position. Only then can be pawl 15 rotate past the projection 17 and move against the supporting cam 18 in the in-use position.

The invention claimed is:

1. A seat for use in a vehicle and configured to be movable between a generally upright in-use position and a retracted cargo position, the seat comprising:
    a seat base;
    a first articulated arm coupled to the seat base and defining a first axis;
    a seat part coupled to the first articulated arm and configured to rotate about the first axis when moving between the in-use position and the cargo position, the seat part includes a rigid, upwardly extending link plate having a protruding end, the protruding end is coupled to the first articulated arm; and
    a backrest coupled to the first articulated arm and configured to rotate about the first axis when moving between the in-use position and the cargo position,
    wherein the seat part and the backrest define a seat surface in the in-use position,
    wherein the backrest is lowerable together with the seat part toward the seat base into the cargo position, and
    wherein the backrest is supported on at least one of the link plate and the first articulated arm in the in-use position via supporting cams integrally formed on at least one of the link plate and the first articulated arm.

2. The seat of claim 1, wherein the protruding end of the link plate is coupled substantially near a first end of the first articulated arm.

3. The seat of claim 2, wherein the link plate and the first articulated arm are supported on each other via a supporting cam arranged on at least one of the first articulated arm and the link plate.

4. The seat of claim 3, wherein the supporting cam is an end stop.

5. A seat for use in a vehicle and configured to be movable between a generally upright in-use position and a retracted cargo position, the seat comprising:
   a seat base;
   a first articulated arm coupled to the seat base and defining a first axis;
   a seat part coupled to the first articulated arm and configured to rotate about the first axis when moving between the in-use position and the cargo position, the seat part includes a rigid, upwardly extending link plate having a protruding end, the protruding end is coupled to the first articulated arm; and
   a backrest coupled to the first articulated arm and configured to rotate about the first axis when moving between the in-use position and the cargo position,
   wherein the seat part and the backrest define a seat surface in the in-use position,
   wherein the backrest is lowerable together with the seat part toward the seat base into the cargo position, and
   wherein the protruding end of the link plate and a first end of first articulated arm include toothings on their circumference into which a pawl coupled to the backrest and having corresponding toothings engages.

6. The seat of claim 5, wherein both the protruding end of the link plate and the first end of the first articulated arm include a first set of toothings and a second set of toothings, the first and second set of toothings of the link plate and the first and second set of toothings of the first articulated arm are aligned congruently in the in-use and cargo positions and are for engagement with a congruently designed toothing of the pawl.

7. The seat of claim 5, wherein the pawl is rotatably coupled to the backrest and is configured to be retained in a latching position by a rotatable cam.

8. The seat of claim 5, wherein the backrest can only be brought into the in-use position when the seat part is in the in-use position.

9. The seat of claim 8, wherein the backrest can only be pivoted back into a forwardly inclined position before the seat part is in the in-use position.

10. The seat of claim 5, wherein a projection is operatively connected to the pawl and integrally formed on the circumference of the first end of the first articulated arm, the pawl is configured to be brought into abutment against the projection when raising the backrest until the first articulated arm is in the in-use position.

11. The seat of claim 5, further comprising a first spring element that is tensioned when the seat part is lowered to the cargo position.

12. The seat of claim 11, further comprising a second spring element that is tensioned when the seat part is raised to the in-use position.

13. The seat of claim 5, further comprising a second articulated arm movably coupled to a front region of the seat part, the second articulated arm having a first end coupled to the seat part and a second end coupled to the seat base and being aligned substantially parallel to the first articulated arm.

14. A seat for use in a vehicle and configured to be movable between a generally upright in-use position and a retracted cargo position, the seat comprising:
   a seat base;
   a first articulated arm coupled to the seat base and defining a first axis;
   a seat part coupled to the first articulated arm and configured to rotate about the first axis when moving between the in-use position and the cargo position, the seat part includes a rigid, upwardly extending link plate having a protruding end, the protruding end is coupled to the first articulated arm;
   a backrest coupled to the first articulated arm and configured to rotate about the first axis when moving between the in-use position and the cargo position; and
   a second articulated arm having a first end coupled to a front region of the seat part and an opposite second end coupled to the seat base,
   wherein the seat part and the backrest define a seat surface in the in-use position,
   wherein the backrest is lowerable together with the seat part toward the seat base into the cargo position, and
   wherein the backrest is supported on at least one of the link plate and the first articulated arm in the in-use position via supporting cams integrally formed on at least one of the link plate and the first articulated arm.

15. The seat of claim 14, wherein the second articulated arm is aligned substantially parallel to the first articulated arm.

16. The seat of claim 14, wherein the protruding end of the link plate is coupled substantially near a first end of the first articulated arm.

17. The seat of claim 16, wherein the link plate and the first articulated arm are supported on each other via a supporting cam arranged on at least one of the first articulated arm and the link plate.

18. The seat of claim 17, wherein the supporting cam is an end stop.

19. A seat for use in a vehicle and configured to be movable between a generally upright in-use position and a retracted cargo position, the seat comprising:
   a seat base;
   a first articulated arm coupled to the seat base and defining a first axis;
   a seat part coupled to the first articulated arm and configured to rotate about the first axis when moving between the in-use position and the cargo position, the seat part includes a rigid, upwardly extending link plate having a protruding end, the protruding end is coupled to the first articulated arm;
   a backrest coupled to the first articulated arm and configured to rotate about the first axis when moving between the in-use position and the cargo position; and
   a second articulated arm having a first end coupled to a front region of the seat part and an opposite second end coupled to the seat base,
   wherein the seat part and the backrest define a seat surface in the in-use position,
   wherein the backrest is lowerable together with the seat part toward the seat base into the cargo position, and
   wherein the protruding end of the link plate and a first end of first articulated arm include toothings on their circumference into which a pawl coupled to the backrest and having corresponding toothings engages.

20. The seat of claim 19, wherein both the protruding end of the link plate and the first end of the first articulated arm include a first set of toothings and a second set of toothings, the first and second set of toothings of the link plate and the first and second set of toothings of the first articulated arm are aligned congruently in the in-use and cargo positions and are for engagement with a congruently designed toothing of the pawl.

21. The seat of claim 19, wherein the pawl is rotatably coupled to the backrest and is configured to be retained in a latching position by a rotatable cam.

22. The seat of claim 19, wherein the backrest can only be brought into the in-use position when the seat part is in the in-use position.

23. The seat of claim 22, wherein the backrest can only be pivoted back into a forwardly inclined position before the seat part is in the in-use position.

24. The seat of claim 19, wherein a projection is operatively connected to the pawl and integrally formed on the circumference of the first end of the first articulated arm, the pawl is configured to be brought into abutment against the projection when raising the backrest until the first articulated arm is in the in-use position.

25. The seat of claim 19, further comprising a first spring element that is tensioned when the seat part is lowered to the cargo position.

26. The seat of claim 25, further comprising a second spring element that is tensioned when the seat part is raised to the in-use position.

* * * * *